United States Patent

Wadsworth et al.

[11] Patent Number: 6,118,885
[45] Date of Patent: Sep. 12, 2000

[54] AIRBORNE IMAGE ACQUISITION AND PROCESSING SYSTEM WITH VARIABLE CHARACTERISTICS

[75] Inventors: Alain Wadsworth, Jouy en Josas; Charles Goillot, St Germain de la Grange; André Sander, Fourqueux; André Renot, Franconville, all of France

[73] Assignee: Institut Francais du Petrole, Rueil-Malmaison Cedex, France

[21] Appl. No.: 08/867,048

[22] Filed: Jun. 2, 1997

[30] Foreign Application Priority Data

Jun. 3, 1996 [FR] France .................................. 96 06907

[51] Int. Cl.[7] .............................. G06K 9/00; H04B 7/185
[52] U.S. Cl. ........................... 382/100; 348/144; 370/317
[58] Field of Search ..................................... 382/109, 108, 382/103, 106, 191, 190, 204, 318, 100, 110, 282, 283, 284; 250/253; 348/143, 144, 145; 702/5, 13, 16; 370/317

[56] References Cited

U.S. PATENT DOCUMENTS

| | | | |
|---|---|---|---|
| 4,134,683 | 1/1979 | Goetz et al. | 356/407 |
| 4,421,981 | 12/1983 | Hough | 250/253 |
| 4,678,911 | 7/1987 | Sundberg et al. | 250/253 |
| 4,864,127 | 9/1989 | Brame | 250/253 |
| 4,908,763 | 3/1990 | Sundberg | 702/13 |
| 4,951,136 | 8/1990 | Drescher et al. | 348/145 |
| 5,323,317 | 6/1994 | Hampton et al. | 702/3 |
| 5,329,595 | 7/1994 | Davies | 382/103 |
| 5,467,271 | 11/1995 | Abel et al. | 702/5 |
| 5,471,056 | 11/1995 | Prelat | 250/253 |
| 5,557,397 | 9/1996 | Hyde et al. | 356/5.01 |
| 5,719,949 | 2/1998 | Koeln et al. | 382/109 |
| 5,764,819 | 6/1998 | Orr et al. | 382/110 |

FOREIGN PATENT DOCUMENTS

| | | | |
|---|---|---|---|
| 0589554 | 7/1993 | European Pat. Off. | G01V 9/04 |
| 2131649 | 6/1984 | United Kingdom | H04N 3/02 |

OTHER PUBLICATIONS

*Institute of Electrical Engineers*, by R. A. Neville et al, "Development and Evaluation of the MEIS II Multidetector Electrooptical Imaging Scanner" (Abstract Only).

*Institute of Electrical and Electronics Engineers*, Jul. 1989, by Gower et al, "The FLI Airborne Imaging Spectrometer: Experience With Land and Water Targets", pp. 1024–1027.

*Primary Examiner*—Jon Chang
*Assistant Examiner*—Jayanti K. Patel
*Attorney, Agent, or Firm*—Antonelli, Terry, Stout & Kraus, LLP

[57] ABSTRACT

A static system designed for acquisition and processing of images of an area flown over in several spectral bands, which are variable on request, of the visible or infrared spectrum. The system includes an on-board assembly including a two-dimensional (distance×frequency) CCD matrix type photography device (1) suited for acquisition of successive images of strips of ground flown over in one or more spectral bands spread by a dispersion unit, and a processing unit (2) associated with a trajectory and trim determination device (3, 4), allowing selection in real time of images of the site in one or more spectral bands whose respective widths and spectral functions can be changed at will by means of software according to the nature of the phenomena to be analyzed within the scope of the application where it is used, and allowing ready linking up of images shifted by fluctuations of the aircraft trajectory, notably due to roll. The ease of operation and of adjustment thereof is linked with the absence of moving mechanical parts. The system can be used for detection of phenomena such as fires in vegetation areas, climatic events, such as drought, downpour, hail, frost, damage caused by pathogenic agents, insects or birds, for example, or the effects of pollution by hydrocarbons, and similar conditions.

12 Claims, 4 Drawing Sheets

AIRBORNE IMAGE ACQUISITION AND PROCESSING SYSTEM WITH VARIABLE CHARACTERISTICS

FIELD OF THE INVENTION

The present invention relates to a system for acquisition and processing of images of an area flown over by an aircraft or a satellite. The images might be in several spectral bands, variable on demand, of the visible or infrared spectrum. The invention permits detection of phenomena linked with significant alterations of the area, and notably of the plant cover thereof.

The system according to the invention can be applied in various fields where changes of state of the vegetation are translated into significant changes in the radiation emanating therefrom in definite parts of the frequency spectrum. The following examples can be mentioned:

remote sensing of forest fires or analogous fires, and prediction of the most threatened areas during the evolution thereof, remote sensing of leakage of substances, such as hydrocarbons escaping from tanks or pipes, notably from buried pipelines, by detecting alterations undergone by the surrounding vegetation, remote sensing of damage caused by climatic events, such as hail, downpour, drought, frost, pathogenic agents, insects, birds, etc.

BACKGROUND OF THE INVENTION

Various types of remote sensing devices are used, notably for fire monitoring. They are installed on the ground in an observation station, in an aircraft or an aerostat connected to a ground station by cable or Hertzian transmission, and they are suited for acquiring images of the radiations emitted by a monitored area in different spectral bands and for processing the images so as to visually highlight certain data characteristic of the fire. Devices of this type are described, for example, in the following documents:

Hirsch S. N. et al., 1973, The bispectral Forest Fire Detection System, in The Surveillant Science, Holz Ed., Houghton Mifflin Cy, Boston;

Goillot C. et al., 1988, in Etude dynamique des feux de forêts par scanner aéroporté multibande dans le visible et le thermique, in Proceedings ISPRS, Kyoto;

Leckie D. G., 1994, Possible Airborne Sensor, Processing and Interpretation Systems for Major Forestry Applications, in Proceedings of the first International Airborne Remote Sensing Conference and Exhibition (I.A.R.S.C.E.), Strasbourg; or Ambrosia V. G. et al., 1994, AIRDAS, Proceedings of the I.A.R.S.C.E., Strasbourg.

SUMMARY OF THE INVENTION

The static image acquisition and processing system according to the invention allows monitoring of an area from one or more aircraft in order to detect phenomena linked with significant alterations of the area. The invention comprises an on-board assembly, including a photosensitive element matrix type photography device suited for sequential acquisition of successive images of strips of ground flown over in a series of narrow spectral "windows", and a control unit including means for selecting images of the site in one or more spectral bands, each comprising a definite number of spectral windows whose respective widths and spectral functions can be changed at will by means of software according to the nature of the phenomena to be analyzed within the scope of the application considered, and compensation means for readily linking up images shifted by at least some of the fluctuations of the aircraft trajectory, notably roll.

According to an embodiment, the system includes means for forming, on a sensitive element matrix, n juxtaposed images of a transverse strip of ground flown over continuously by the aircraft in n narrow spectral windows, and the control unit comprises selective stacking means for stacking signals from said matrix corresponding to a definite number of spectral windows, including selective signal weighting means.

The control unit comprises, for example, a calculator programmed to stack and to weight said signals.

The means used to form n juxtaposed images of a transverse strip of ground in n spectral windows are, for example, an optical assembly and a spectral scatterer.

According to an embodiment, the system comprises means for locating the position of the aircraft and fluctuations of the trajectory thereof, the control unit includes a calculator programmed to select sets of sensitive elements allowing to linking of the strips of ground flown over successively with one another.

The system can include means for transmitting images to a remote station, and a processing unit for applying specific processings to the images so as to point up significant changes in the area flown over.

The system according to the invention is of relatively simple design, and, on account of the mode of formation of images from the sensitive elements of the photography device, it allows complex processings to be readily performed, such as a) highlighting of aspects of phenomena affecting the site or part thereof, linked with the frequency spectrum of the light emanating therefrom, or b) correction instantaneously of interferences on the acquired images caused by instability of the aircraft on the trajectory assigned thereto.

The system is static. It allows acquisition of images and selection of spectral bands without requiring, like many former systems, optical scanning mechanisms or interposition of optical filters, which bring about many implementation and adjustment difficulties.

The on-board control unit can include image pre-processing modules allowing reduction of the amount of data to be transmitted by Hertzian wave to the ground control and attendance station. The selection that can be performed by means of software inside images of the area flown over allows ready isolation of contributions of parts of the field or of particular wavelengths within each of the spectral bands selected as a function of the indications to be detected, as is well-known to the man skilled in the art within the scope of the application considered.

BRIEF DESCRIPTION OF THE DRAWINGS

Other features and advantages of the system according to the invention will be clear from reading the description hereafter of embodiments given by way of non limitative examples, with reference to the accompanying drawings in which.

DESCRIPTION OF THE PREFERRED EMBODIMENTS

Figure 1:
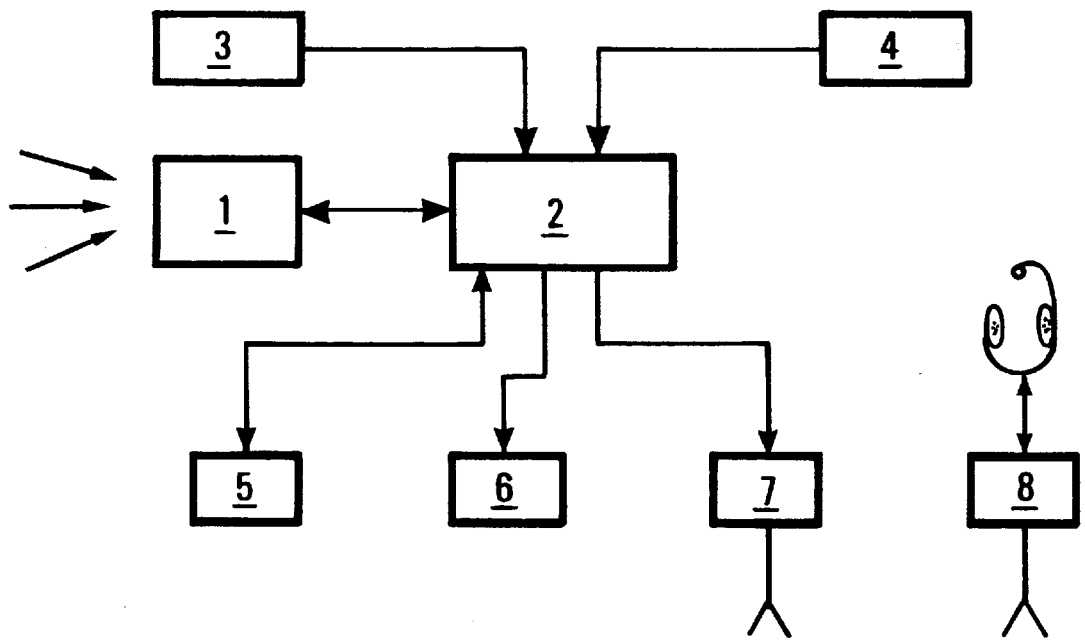
FIG. 1 is a general block diagram of the airborne selective image acquisition and transmission system.

The on-board system comprises (FIG. 1) a photography device 1 designed to take pictures of a site flown over by an aircraft or a satellite, associated with an acquisition and control unit 2 suited to form, select and correct images of the site flown over. Unit 2 is connected to a navigational device 3 allowing continuous association of geographic data with the images acquired, and to an attitude control device 4 whose indications allow readjustment of the images acquired according to the trajectory and trim fluctuations of the aircraft. The system further comprises recording means 5, display means 6 allowing various checks, such as proper alignment in relation to the area to be flown over, conformity of the meteorological situation (absence of clouds, possible shades, and quality of the images acquired. The recorded images are sequentially transmitted to the remote station by a Hertzian transmission system 7. A VHF transmitter-receiver 8 allows phonic communication with the remote station.

The acquisition and control unit 2 can comprise one or more modules intended to apply to the images formed a certain number of pre-processings, allowing reduction of the volume of data to be transmitted.

Figure 2:
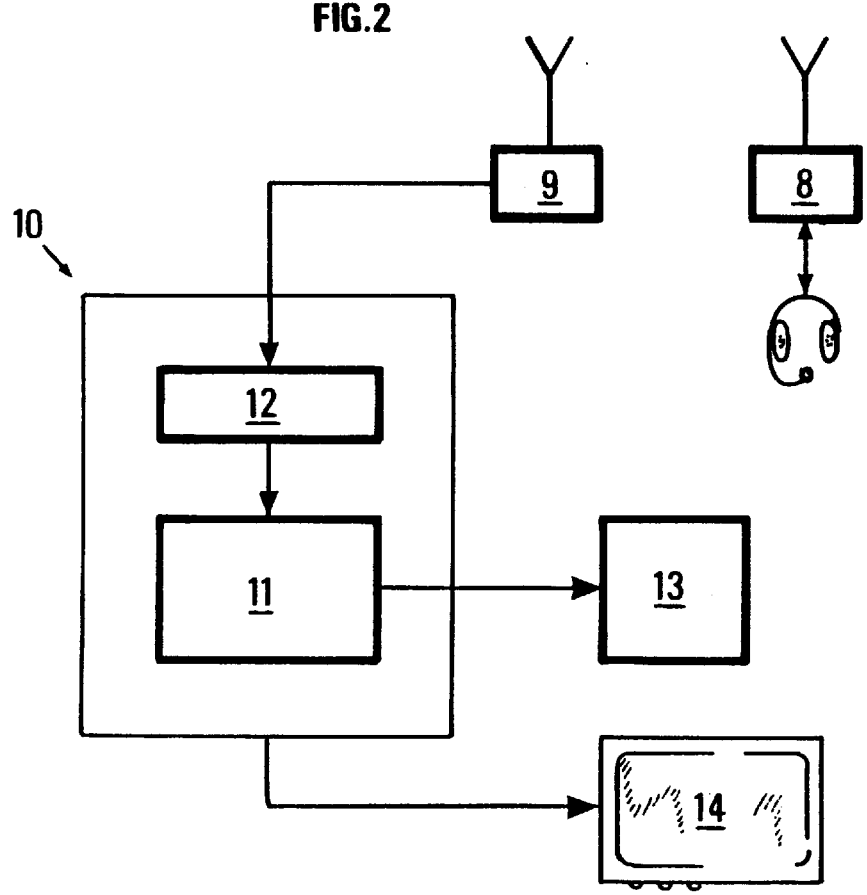
FIG. 2 is a block diagram of an image collection and processing system in a remote station, FIG. 3 diagrammatically shows the CCD matrix photography device.

The images transmitted from the aircraft are received sequentially by a Hertzian receiver 9 (FIG. 2) and acquired by an acquisition and processing unit 10 comprising a microcomputer 11 provided with video acquisition cards 12 and with a thematic processing programme module specifically suited to the mission. The images processed in order to highlight, by means of colour coding for example, signs indicative of a phenomenon sought, are stored by a video recorder 13 and displayed by one or more video monitors 14.

Figure 3:
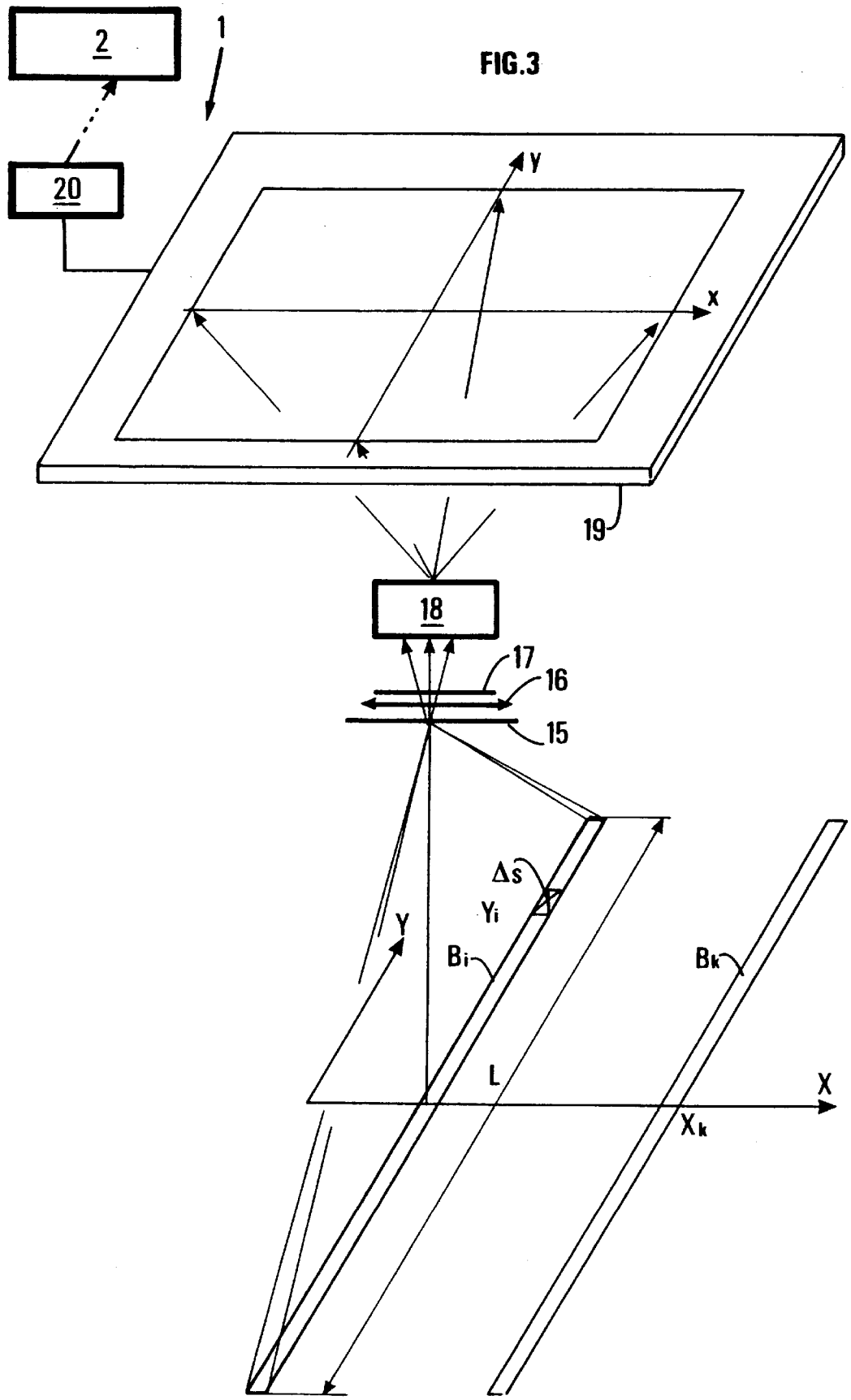

The photography device 1, schematized in FIG. 3, includes an optical system comprising a lens 15 associated with a slot 16 and possibly an optical bandpass filter 17 chosen to preselect one or more spectral ranges useful within the scope of the phenomenon studied, this system forming the image of a strip of ground of width L along axis Y transversely to the direction X of movement of the aircraft, on a spectral scatterer 18 such as a grating. The light beam from grating 18 is received on a rectangular matrix 19 of sensitive elements of CCD type for example, connected to adjustable-gain amplification and analog-to-digital conversion circuits 20.

The CCD matrix 19 has a number $N_1$ of lines and a number $N_2$ of columns which are integral powers of the number 2 and which can be selected, for example. The numbers $N_1$ of lines and $N_2$ of columns are respectively equal, for example, to $2^{n1}$ (i.e., 2 to the power n1) lines and $2^{n2}$ columns. A square matrix with n1=n2=9 or 10, therefore comprising 512 or 1024 lines and 512 or 1024 columns, can be selected, for example.

Figure 4:
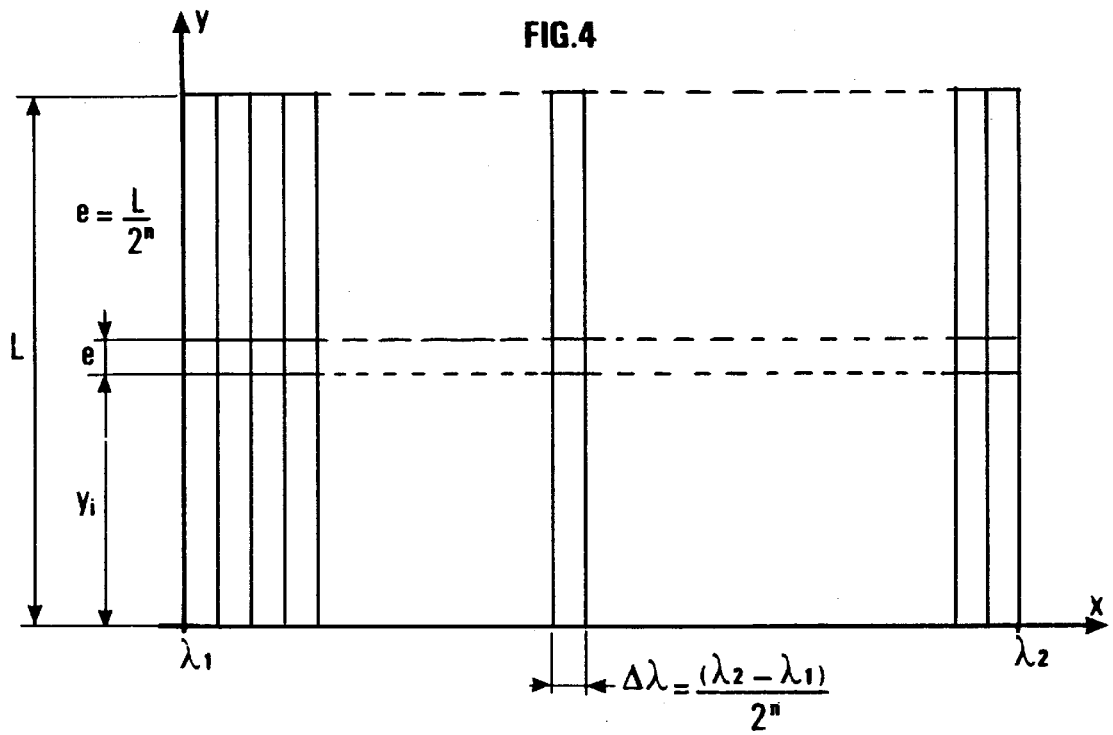
FIG. 4 illustrates the assignment of the various lines and columns of the image acquisition CCD matrix.

The line parallel to the X axis and passing through the ordinate yi of the matrix (FIG. 4) is, for example the image of the portion ΔS (FIG. 3) of the strip of ground Bi observed in $2^n$ adjacent spectral "windows" of width $\Delta\lambda=(\lambda_2-\lambda_1)/2^n$, where $(\lambda_2-\lambda_1)$ is the width of the spectral band selected by the optical system 16, 17, 18. Similarly, each column yk (k=1, 2, . . . $N_1$) represents, for example, the image of a transverse strip of ground Bk passing through abscissa Xk in a spectral slot Δλk. We thus have $N_1 \times N_2$ two-dimensional signals that open up different combination possibilities in order to:

establish contributions of particular spectral bands or of portions of the area flown over, introduce weightings, or take account of aircraft trajectory disturbances, as described hereafter.

Figure 5:
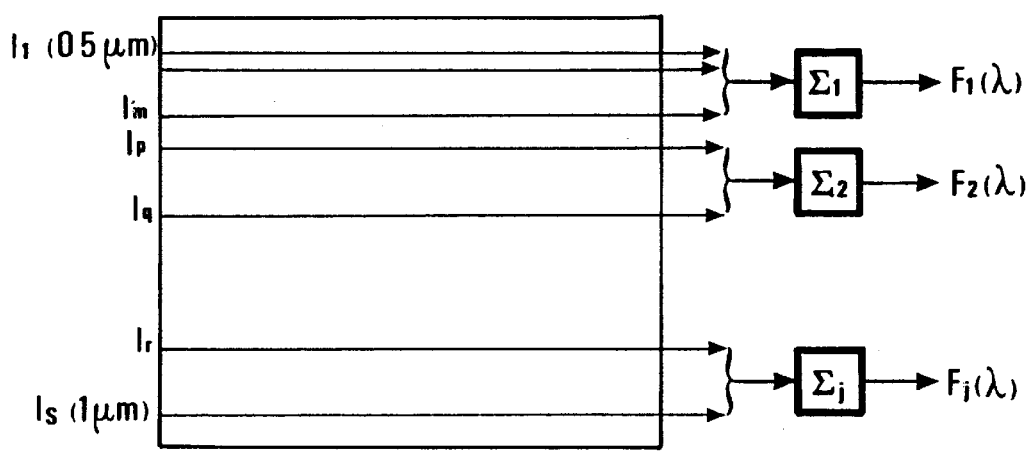
FIG. 5 illustrates the formation of spectral functions from frequency bands of selected widths.

Control unit 2 comprises (FIG. 5) stacking means Σ1, Σ2, . . . Σj allowing formation of signals representative of spectral functions F1(λ) . . . Fj(λ), each including a definite number of spectral windows of width Δλ selected from the $N_2$ spectral windows or matrix lines available, optionally by introducing into the stackings weighting coefficients ai,j allowing adjustment of both the spectral width of each of these functions F1(λ) to Fj(λ) and the shape of its spectrum.

Figure 6:
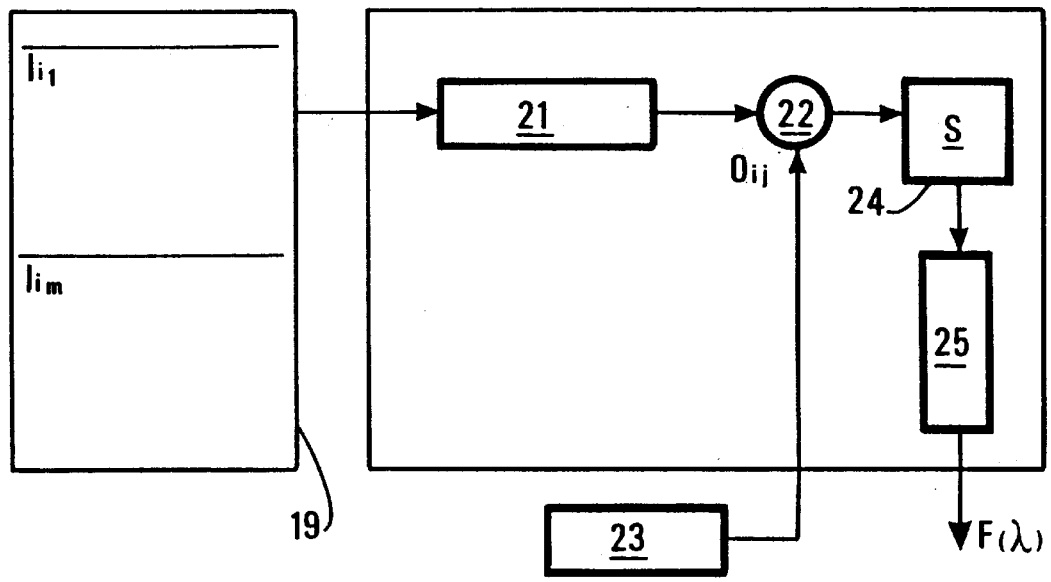
FIG. 6 shows an embodiment of a spectral function formation subset.

These stackings can be achieved, for example, as shown in FIG. 6. To form a spectral function F(λ), the CCD matrix 19 is connected to a shift register 21 that reads successively m lines 1l to 1m corresponding to m spectral windows to be stacked. Each line comprises, for example, M eight- or sixteen-bit numeric words representing the signals read in the M cells of the corresponding line of the CCD matrix. The M words of each line read in register 21 are successively transferred to a weighting element 22 which multiplies them by a weighting factor or coefficient ai,j taken from a memory 23 prior to being transferred to a stacker S 24. The corresponding words of the m lines 1il to 1im bearing weighting coefficients are stacked and transferred into a second shift register 25.

The weighting coefficients ai,j can be the same for all the cell lines of the matrix (ai,j=a0) or different for each one of them but common to all the cells of the same line (i=j), or different for all the words within the same line. It is easy to adapt to particular conditions imposed for a given application by changing the content of the coefficients loaded in weighting memory 23. The shape of each spectral function F(λ) can, for example, be changed at will, which is not possible with conventional interference filters whose passband is predefined and generally of Gaussian shape.

Selective application of weighting coefficients allows intensifying of the gain applied to the images in definite spectral band portions where changes of the site in response to a phenomenon are particularly appreciable. This is notably the case when areas of a site where the vegetation suffers for various reasons, such as hydric deficit, pollution, which affects its reflectivity or emissivity in certain spectral bands, which are to be detected.

This selective reading and weighting ability of the matrix cells also allows isolation and weighting of the contributions of selected portions of the strips Bi of the site passing below the aircraft that are successively analyzed.

Trajectory fluctuations of the aircraft can therefore be taken into account, notably pitching motions that can sometimes lead to a certain temporal disorder in the succession of the strips of ground Bi acquired, and rolling motions that change the ordinates Yi of the strip portions B actually seen continuously by the various cells of the matrix.

Figure 7:
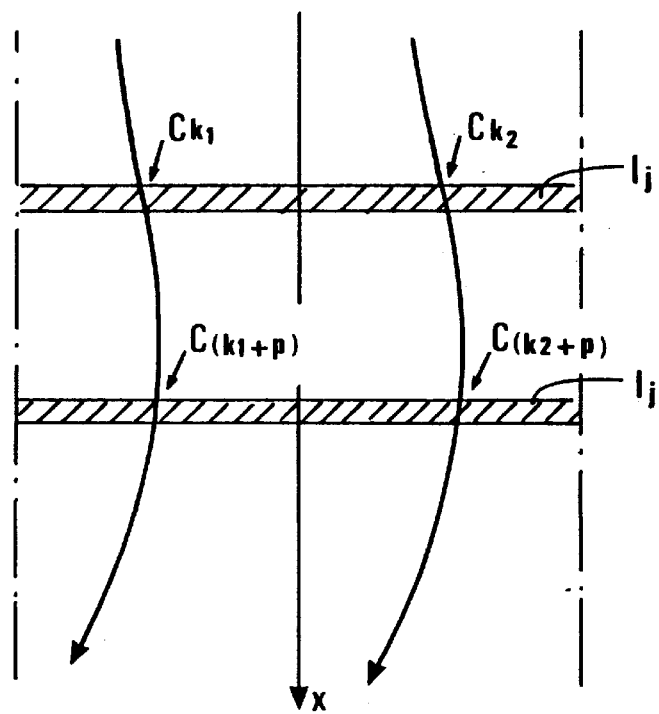
FIG. 7 illustrates the effect of roll of the aircraft on the images detected.

For example, a rolling motion affecting the trajectory of the aircraft can shift the series of cells of a line 1j of the matrix "seeing" a portion of the ground flown over. It is a series $Ck_1$ to $Ck_2$ that is concerned at an image acquisition instant (FIG. 7), and a shifted series $Ck_{1+p}$ to $Ck_{2+p}$ at the next acquisition instant. Acquisition and control unit 2 (FIG. 1), which permanently receives indications from attitude control device 4, is suited to pair the successive series so as to compensate for shifts.

A pitching motion of the aircraft has the effect of disturbing the normal order of succession of the strips of ground seen by the sensitive cell lines, a strip of ground that has already been "seen" being back in the field detected by the photography device as a result, for example, of a diving motion of the aircraft. Similarly acquisition and control, unit 2 takes account of the indications supplied by attitude control device 4 so as to rearrange in sequence the images of the strips of ground passing below the aircraft.

Photography device 1 can comprise, according to availabilities and to the spectral bands analyzed within the scope of the application considered for the device, one or more cameras associated with spectral spreading means analogous to spectral scatterer 18.

Without departing from the scope of the invention, a plurality of on-board systems can be used aboard several aircraft, all of them transmitting their images to a central station intended to collect images and to perform specific processings linked with the phenomena to be shown, or all the means required for acquisition and processing of the images can be installed aboard the same aircraft.

When the device is used for detection, in a vegetation area, of signs indicative of a stress of the vegetation and of the presence of spots propitious to the birth of a fire or to the spreading thereof, acquisition and control unit 2 and processing unit 10 can be advantageously provided with software coding image processing algorithms. The photography device takes pictures of the area flown over in a first spectral band selected in the red part of the visible spectrum, in a second spectral band of the near infrared spectrum, and in a third spectral band in the thermal infrared spectrum selected to locate parts of the area displaying both hydric stress and hot spots with more or less high temperatures, according to whether the operation conducted is a fire prevention or fire fighting operation. Coded composite images obtained by colour coding, for example, of the aforementioned spectral bands are formed from these images, and the images obtained in the three spectral bands are combined by means of a specific processing algorithm which thus spotlights fire development risks caused by this deficit and local overheating, described in a Japanese patent application 96/06,906 in the name of the applicant.

What is claimed is:

1. An airborne system for acquisition and processing of images of a monitored ground area, to detect selected phenomena linked to significant alterations of the ground area, said system comprising:

a photosensitive device having a sensitive matrix;

optical means for scattering on said sensitive matrix images of successive strips of the ground area as the ground area is flown over, to cause said sensitive matrix to sequentially produce signals corresponding with a series of narrow juxtaposed spectral slots, each slot having a determined frequency width;

a first memory for storing the produced signals;

a control unit, including a second memory for storing a set of weighting factors;

means for forming a spectral band including a selected number of spectral slots;

weighting means connected to said second memory for weighting respective contributions of the spectral slots included in the spectral band based on the weighting factors to give the spectral band a spectral function with a varying amplitude for enhancing detection of the selected phenomena;

compensation means for linking images shifted by fluctuations of the airborne trajectory due to roll; and switching means for cyclically giving different spectral functions to the spectral band by changing weighting contributions of the respective spectral slots included therein, for different ground strips successively flown over, to cyclically enhance detecting of different selected phenomena.

2. A system as claimed in claim 1, wherein said control unit further includes a calculator for stacking the weighting factors.

3. A system as claimed in claim 1, further comprising means for locating the position of the airborne system and fluctuations of the trajectory of the airborne system, and wherein said control unit includes means for linking data in the first memory to allow matching strips of the ground area successively flown over.

4. A system as claimed in claim 1, further comprising means for transmitting images to a remote station.

5. A system as claimed in claim 1, further comprising a processing unit for applying to images processing algorithms for pointing up significant changes in the ground area flown over.

6. A system as claimed in claim 5, wherein said processing unit includes means for detecting fire risks in vegetation the ground area flown over.

7. A system as claimed in claim 5, wherein said processing unit includes means for detecting climatic events.

8. A system as claimed in claim 5, wherein said processing unit includes means for detecting damage due to animal population.

9. A system as claimed in claim 5, wherein said processing unit includes means for detecting damage due to pathogenic agents.

10. A system as claimed in claim 5, wherein said processing unit includes means for detecting effects of pollution due to hydrocarbons.

11. A system as claimed in claim 5, wherein said processing unit is at a remote station, and said system further comprises means for transmitting images to the remote station.

12. A method of processing images of a ground area monitored from an aircraft in order to detect selected phenomena linked with significant alterations of the ground area, utilizing a static on-board assembly including a photosensitive device with a sensitive matrix, optical means for scattering on the matrix images of successive strips of the ground area as the ground area is flown over, the matrix sequentially producing signals corresponding with a series of narrow juxtaposed spectral slots, each spectral slot having a determined frequency width, acquisition means for storing the produced signals, and compensation means for linking up images shifted by fluctuations of the aircraft trajectory due to roll, said method comprising:

forming a spectral band including a selected number of spectral slots, each spectral slot weighted to give the spectral band a determined spectral function with an amplitude varying inside the spectral band to enhance detection of the selected phenomena; and cyclically giving different spectral functions to the spectral band by changing weighting contributions of the respective spectral slots included therein, for different ground strips successively flown over by the aircraft, to cyclically enhance detection of different selected phenomena.

* * * * *